United States Patent [19]
Bennett

[11] Patent Number: 4,565,152
[45] Date of Patent: Jan. 21, 1986

[54] SAFETY FLAG

[76] Inventor: Charles O. Bennett, P.O. Box 712, Benton, La. 71006

[21] Appl. No.: 562,749

[22] Filed: Dec. 19, 1983

[51] Int. Cl.[4] ............................................. G09F 17/00
[52] U.S. Cl. ........................................ 116/50; 40/517; 40/492; 40/591; 116/52; 116/173; 116/303; 116/324; 116/313
[58] Field of Search ...................... 116/51, 52, 50, 173, 116/174, 319, 313, 321, 324, 325, 322, 303; 242/107, 54 R, 86.8, 86.5 R; 40/517, 492, 591; 254/383, 270, 214

[56] References Cited

U.S. PATENT DOCUMENTS

| | | | |
|---|---|---|---|
| 1,321,837 | 11/1919 | Mader | 116/173 |
| 1,377,082 | 5/1921 | Louthan | 116/50 |
| 3,797,450 | 3/1974 | Frisbee | 116/173 |

FOREIGN PATENT DOCUMENTS

| | | | |
|---|---|---|---|
| 49241 | 12/1938 | France | 116/313 |

Primary Examiner—Steven L. Stephan
Assistant Examiner—Denis E. Corr
Attorney, Agent, or Firm—John M. Harrison

[57] ABSTRACT

A safety flag bus, which includes a spring-loaded recoil pulley carrying a length of cable extending from the pulley around a bushing attached to the hinge mechanism of a conventional stop arm attached to the bus. The cable extends through one end of a flag storage pipe attached to the stop arm and through a slot in the pipe, around a pulley attached to the flared opposite end of the pipe, to a point of fixed attachment to the bus. A flexible flag rod extends into the flared end of the flag storage pipe and one end of the rod is secured to the cable extending through the pipe, while the other end carries a flag normally located inside the pipe when the device is in retracted configuration. Activation causes extension of the flag storage pipe outwardly of the bus, extension of the cable from the recoil pulley and projection of a portion of the flag rod from the flag storage pipe to extend the flag outside of the flared end.

In a second embodiment the flag rod and flag are positioned in cooperation with a flag storage pipe mounted on the hood or frontal area of the bus. One end of the flag rod is attached to a motor-driven endless cable, one leg of which extends through a portion of the pipe and the endless cable is mounted on a pair of spaced pulleys located at each end of the pipe.

19 Claims, 8 Drawing Figures

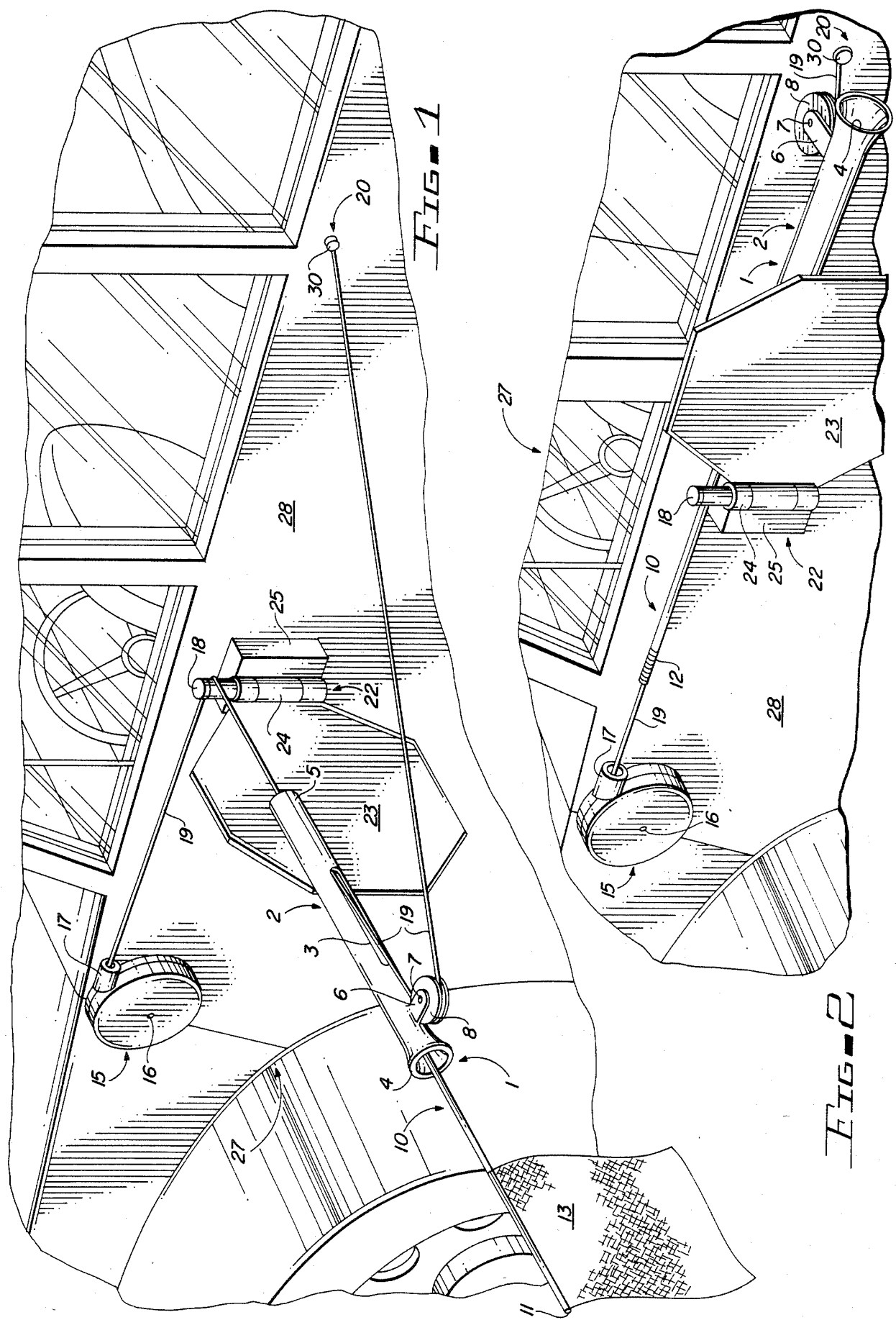

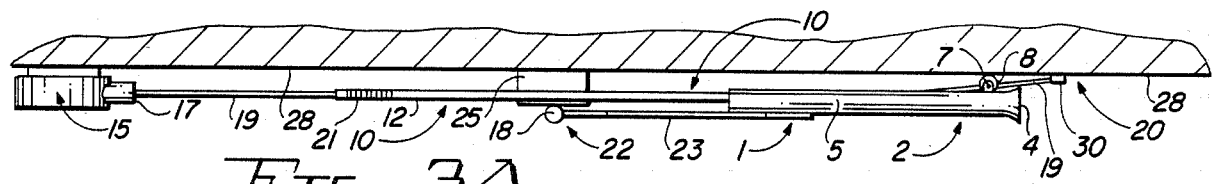
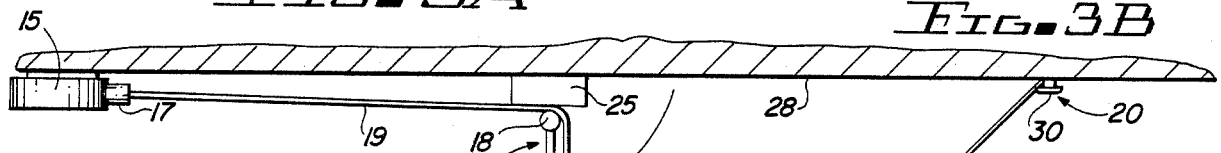
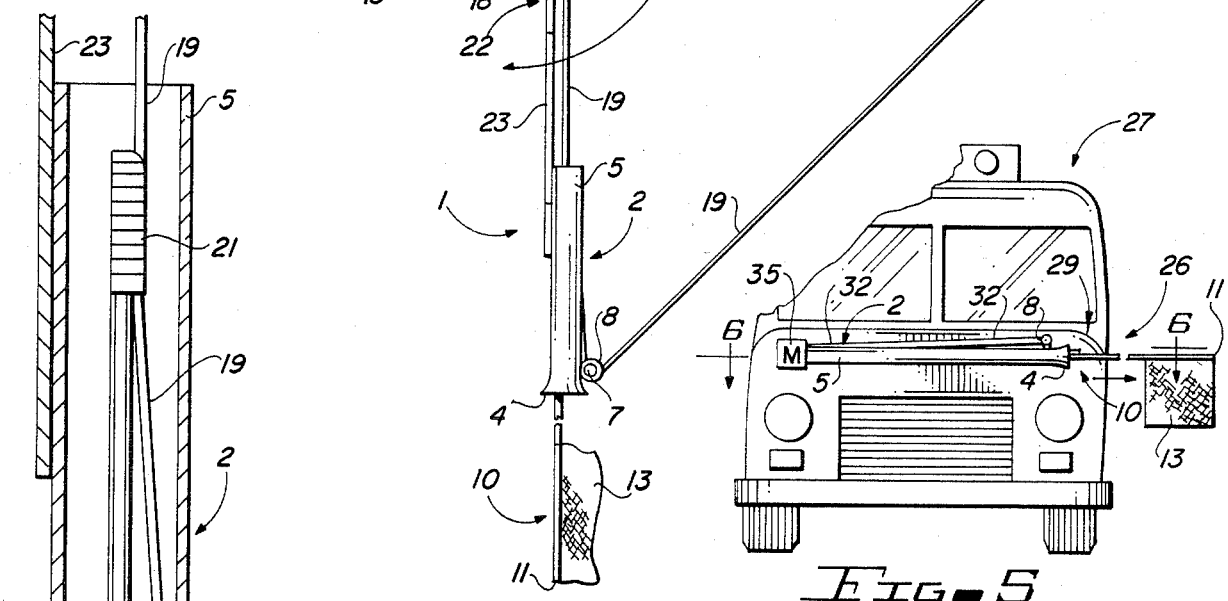
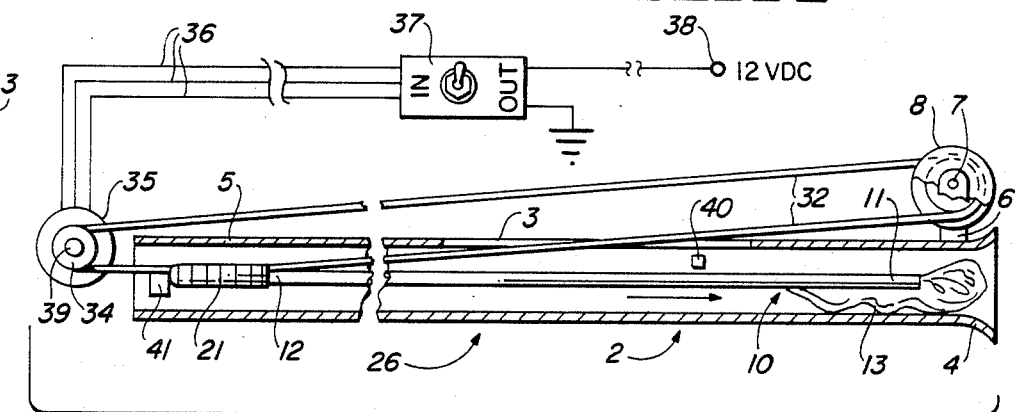
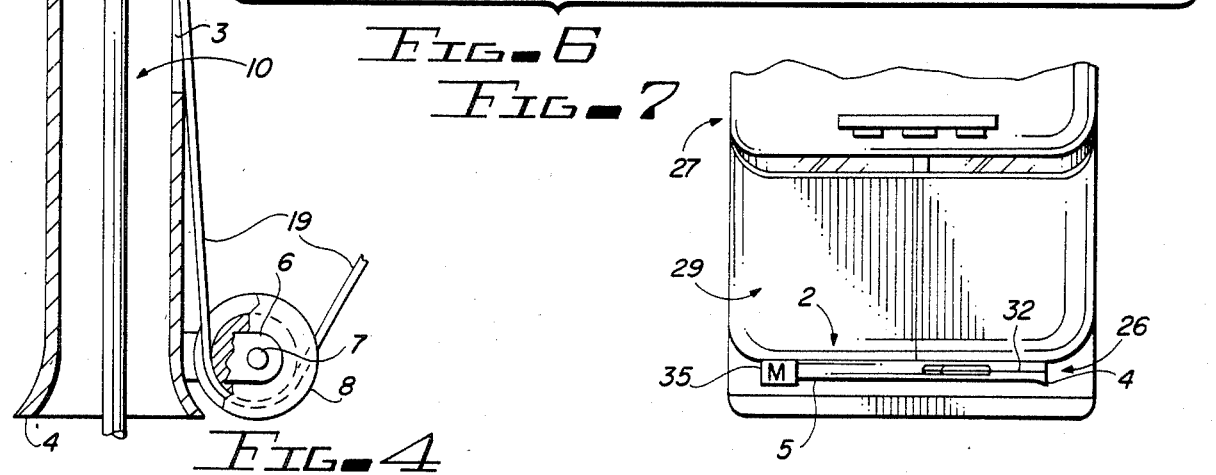
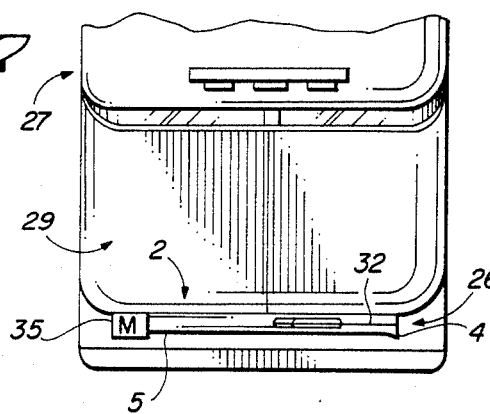

SAFETY FLAG

BACKGROUND OF THE INVENTION

1. Field of the Invention

This invention relates to safety devices for school buses, public works vehicles and other vehicles which must make periodic stops in traffic to load and unload passengers or workers. More particularly, the invention relates to a safety flag mounted in cooperation with a school bus or other vehicle and designed to project from the carrying vehicle to serve as a warning to motorists behind the vehicle. In a first embodiment, the safety flag is caused to extend from and retract into a flag storage pipe attached to a conventional safety stop arm carried by the bus, by operation of a cable linkage system activated by the stop arm. In a second embodiment, the flag and flag rod are adapted to selectively extend from and retract into a hood or fender-mounted flag storage pipe by operation of an endless cable, one leg of which extends through a portion of the pipe, the endless cable carried by a pair of spaced pulleys activated by a cooperating motor and switch system.

The safety flag of this invention is design to slow or stop the flow of traffic around a school bus, public works truck or vehicle, or other vehicle which is required to make periodic stops in traffic, in order to enhance the safety of the occupants of the vehicle as they enter and leave. When extended, the safety flag projects from a flag storage pipe cooperating with the vehicle and warns motorists behind the bus or vehicle of the danger to persons entering or departing when the vehicle is stopped.

A major cause of accidents involving school children who ride to and from school in parish or county-operated school buses is the striking of children by motorists who attempt to pass the bus after the latter has come to a complete stop and the passengers are loading or unloading. In spite of the conventional manual or automatic stop arm mechanisms which open when the bus is stopped to display the familiar octagon-shaped stop signs, impatient motorist sometimes persist in driving around and passing the bus, sometimes striking a child walking into the path of the moving vehicle from the front of the bus. The safety flag of this invention is designed to at least minimize this hazard by extending a flag into or near the lane of traffic adjacent the bus or vehicle, to act as an additional warning to motorists following the bus.

2. Description of the Prior Art

Various devices are known in the prior art for enhancing the safety of motor vehicles. An early "Direction Signal for Automobiles" is disclosed in U.S. Pat. No. 1,542,152, dated June 16, 1925 and includes an arm pivotally attached to the vehicle and designed to swing upwardly responsive to activation by the driver, to a position where motorists behind the vehicle can observe the direction of turn. Another "Automobile Signal" is disclosed in U.S. Pat. No. 1,720,108, dated July 9, 1929, to D. D. Van Osdol. The Van Osdol signal includes a box-like structure with a plurality of spaces which can be illuminated from within. The structure is designed to present either a left or a right-hand signal to motorists located behind the vehicle, in order to indicate to the trailing motorists which direction the leading vehicle will turn. U.S. Pat. No. 2,281,171, dated April 28, 1942, to C. Ringwald, discloses a "Signal for Motor Vehicles" which includes a stop arm hingedly attached to the side of a school bus or other vehicle and manipulated by a lever inside the bus to indicate when the vehicle will stop. This device is a forerunner of the conventional stop arm devices which are currently used on many school buses across the country, one variation of which is manufactured by SMC Specialty Manufacturing Company, of Charlotte, N.C. A "Signal" is disclosed in U.S. Pat. No. 2,324,614, dated July 20, 1943, to T. L. Dalton, which signal is mounted on the side of a truck or other vehicle and telescopes upwardly, with a flag and light located at the upper end of the top telescoping member, in order to indicate when the truck has stopped.

It is an object of this invention to provide a new and improved safety flag for enhancing the safety of children and other passengers of school buses and other vehicles which are required to periodically stop and load and unload passengers safety flag is characterized by a flag rod and flag normally deployed in a fixed flag storage pipe and adapted to extend from the pipe when the vehicle is stopped to warn trailing motorists not to pass the vehicle.

Another object of this invention is to provide in one embodiment, a new and improved safety flag for mounting on the stop arm of a school bus, public works vehicle or other vehicle which is equipped with a conventional stop arm warning device and is required to periodically stop in traffic. The safety flag includes a flag mounted on one end of a flag rod positioned inside a flag storage pipe attached to the stop arm, with the opposite end of the flag rod secured to the cable in a cable linkage system cooperating with the stop arm. The flag and flag rod are caused to extend from the flag storage pipe when the stop arm is deployed in functional configuration and to retract inside the flag storage pipe and the flag storage pipe constrained to fold along side the bus, when the stop arm is closed in retracted configuration.

Another object of this invention is to provide in a first preferred embodiment, a new and improved safety flag for protecting passengers during loading and unloading of school buses and other vehicles, which safety flag cooperates with an existing conventional stop arm mounted to the traffic side of the carrying vehicle. The safety flag includes a flexible flag rod having a flag attached to one end, the flag rod slidably disposed inside a flag storage pipe attached to the stop arm, and a guide pulley and cable linkage mechanism anchored by a recoil pulley at one end, the cable extending from a fixed point of attachment on the bus around the guide pulley attached to the flag storage pipe, through a slot in the flag storage pipe and around a pivot point on the stop arm hinge to the recoil pulley. Thus, deployment of the conventional stop arm in functional configuration outwardly from the side of the bus causes the flag rod and flag to extend from the flag storage pipe and retraction of the stop arm against the side of the bus or vehicle results in retraction of the flag and flag rod inside the flag storage pipe and location of the flag storage pipe along side the carrying vehicle.

Yet another object of this invention is to provide, in a second embodiment, a new and improved hood-mounted safety flag which includes a flag storage pipe secured to the hood, bumper or frontal area of a bus or vehicle and a flag rod and flag combination normally disposed in the flag storage pipe. One end of the flag rod is attached to one leg of an endless cable extending through a portion of the pipe, the endless cable carried by a pair of pulleys, one of which pulleys is driven, in order to selectively extend the flag rod and flag from the storage pipe when the vehicle is stopped and retract the flag rod and flag into the pipe when the vehicle is in motion.

SUMMARY OF THE INVENTION

These and other objects of the invention are provided in a safety flag which, in a first preferred embodiment, includes a flag storage pipe having one end attached to the conventional stop arm of a school bus or other vehicle, with a flexible flag rod carrying a flag disposed in the storage pipe and a cable linkage system incorporating a recoil and guide pulley mechanism in cooperation with the flag storage pipe and the flag rod. The cable in the linkage mechanism also wound in biased attachment to the recoil pulley at one end and secured to the carrying vehicle side at the other end, to effect extension of the flag and the flag rod from the flag storage pipe when the stop arm is deployed in functional configuration outwardly from the side of the carrying vehicle and retraction of the flag and flag rod inside the flag storage pipe when the stop arm is retracted and folded along side the vehicle. In a second preferred embodiment, the flag storage pipe is secured to the fender, bumper, hood or other frontal area of the bus or vehicle and the flag rod positioned inside the flag storage pipe and attached to an endless belt or cable. One leg of cable extends through a portion of the pipe and each end of the endless cable is supported by a pair of spaced pulleys, one of which pulleys is driven, in order to selectively deploy the flag and a portion of the flag rod from the flag storage pipe when the bus or vehicle is stopped.

BRIEF DESCRIPTION OF THE DRAWINGS

The invention will be better understood by reference to the accompanying drawings, wherein:

FIG. 1 is a perspective view, partially in section, of a first preferred embodiment of the safety flag, which is illustrated in deployed, functional configuration with respect to a school bus;

FIG. 2 is a perspective view, partially in section, of the safety flag illustrated in FIG. 1, in retracted configuration;

FIG. 3A is a top sectional elevation of the side of the bus or vehicle and the safety flag, more particularly illustrating the safety flag in retracted configuration;

FIG. 3B is a top sectional elevation of the side of the bus or vehicle and the safety flag, more particularly illustrating the safety flag in extended, functional and deployed position;

FIG. 4 is a sectional view of a preferred flag storage pipe and flexible flag rod deployed therein, more particularly illustrating a preferred means for connecting the cable to the flag rod in the first embodiment of the invention;

FIG. 5 is a front elevation, partially in section, of a second preferred embodiment, or hood-mounted safety flag of this invention deployed in functional configuration;

FIG. 6 is a sectional view, taken along lines 6—6 in FIG. 5, more particularly illustrating a preferred endless cable and pulley system for activating the flag rod and flag illustrated in FIG. 5; and FIG. 7 is a top view, partially in section, of the hood-mounted safety flag illustrated in FIGS. 5 and 6, in retracted configuration.

DESCRIPTION OF THE PREFERRED EMBODIMENTS

Referring to FIGS. 1, 2, 3A, 3B and 4 of the drawings and initially to FIGS. 1 and 3B, in a first preferred embodiment of the invention the safety flag is generally illustrated by reference numeral 1. The safety flag 1 includes an elongated flag storage pipe 2, provided with a slot 3 extending longitudinally near the center thereof and in a most preferred embodiment, a flared end 4, opposite and spaced from a cable end 5. The cable end 5 of the flag storage pipe 2 is secured in any convenient manner to the stop sign 23 of a conventional stop arm 22 and the stop sign 23 is mounted to an arm hinge 24. A spacer block 25 spaces the arm hinge 24 from the bus side panel 28 of the bus 27, for reasons which will be hereinafter described. Accordingly, from a consideration of FIGS. 1, 2, 3A and 3B of the drawings, it will be appreciated that the flag storage pipe 2 is capable in one embodiment, of extension into a substantially perpendicular relationship with respect to the bus side panel 28, as particularly illustrated in FIGS. 1 and 3B when the stop sign 23 is functionally deployed. Furthermore, as specifically illustrated in FIGS. 2 and 3A, the flag storage pipe 2 is also capable of being folded into a stored position along side the bus side panel 28 when the stop sign 23 is retracted.

Referring now to FIG. 4, a pipe pulley bracket 6 extends from the flag storage pipe 2 at a point near the flared end 4 and a guide pulley 8 is rotatably mounted to the pipe pulley bracket 6, by means of a pulley pin 7. As further illustrated in FIG. 4, which illustrates the deployed, functional position of the flag rod 10, a segment of the tension cable 19 extends around the guide pulley 8, through the slot 3 in the flag storage pipe 2 and from the cable end 5 of the flag storage pipe 2. The base end 12 of the flag rod 10 is attached to the tension cable 19 by means of tape 21, in order to facilitate movement of the flag 13 into and out of the flag storage pipe 2 responsive to movement of the tension cable 19, as hereinafter described.

Referring again to FIGS. 1, 3B and 4 of the drawings, the flexible flag rod 10, with the flag 13 secured to the flag end 11 thereof and having a base end 12 projecting into the hollow interior of the flag storage pipe 2, is constrained to deploy into and out of the flag storage pipe 2 by movement of the tension cable 19, as the stop arm 22 folds inwardly and outwardly, respectively. The tension cable 19 extends in spring-loaded deployment from a recoil pulley 15, where one end of the tension cable 19 is wound on a spring-operated drum [not illustrated], rotating on a drum pin 16, and is then pivoted around a bushing 18, rotatably secured to the hinge pin [not illustrated]in the arm hinge 24. The tension cable 19 then extends into the cable end 5 of the flag storage pipe 2, through the slot 3 in the flag storage pipe 2 and around the guide pulley 8, as particularly illustrated in FIG. 4, to terminate at a cable mount 20, secured to the bus side panel 28, as illustrated in FIGS. 1 and 2. The cable mount 20 is characterized as a tying member having a projecting head 30, securing one end of the tension cable 19. It will be appreciated that other members such as a bracket or eye bolt, to which the tension cable 19 can be tied, can also be used and can be mounted to the bus side panel 28 in any convenient manner. As further illustrated in FIGS. 2 and 3A of the drawings, and as heretofore described, the base end 12 of the flag rod 10 is secured to the tension cable 19. When the tension cable 19 is in the extended, functional configuration, as illustrated in FIGS. 1, 3B and 4, the tape 21 and base end 12 of the flag rod 10 are located in the flag storage pipe 2 near the cable end 5. Furthermore, when the tension cable 19 is in the retracted configuration illustrated in FIGS. 2 and 3A, the tape 21 and base end 12 are located at a point near the feed nipple 17 of the recoil pulley 15. It will be appreciated by those skilled in the art that any reliable technique for fastening the base end 12 of the flag rod 10 to the tension cable 19 can be used, so long as this junction is capable of sliding freely into and out of the cable end 5 of the flag storage pipe 2, as the safety flag 1 extends and retracts, all as hereinafter more particularly described. Since the recoil pulley 15 is permanently secured to the bus side panel 28 by means of a bracket [not illustrated] it is fixed in position and the tension cable 19 extends into and out of the feed nipple 17, responsive to opening and closing of the stop arm 22, as also further hereinafter described.

Referring now to FIGS. 5-7 of the drawings, in another preferred embodiment of the invention the safety flag of this invention is characterized by a hood-mounted safety flag 26, which includes a flag storage pipe 2, secured to the bus hood 29 of the bus 27. Like the safety flag 1 disclosed in FIGS. 1, 2, 3A, 3B and 4, the hood-mounted safety flag 26 incorporates a flag rod 10 to extend and retract a flag 13, secured to the flag end 11 of the flag rod 10, into and out of the flag storage pipe 2, respectively. Referring specifically to FIG. 6, the base end 12 of the flag rod 10 is secured to the bottom leg of an endless cable 32, by means of tape 21, in the same manner as the safety flag 1. One loop of the endless cable 32 is wound around a drive pulley 34, which is carried by the motor shaft 39 of a motor 35, mounted on the bus hood 29 and located at the cable end 5 of the flag storage pipe 2 with the top leg of the endless cable 32 located outside of the flag storage pipe 2. The opposite loop of the endless cable 32 is carried by a guide pulley 8, positioned on the opposite flared end 4 of the flag storage pipe 2 and freely rotates on the pulley pin 7. The motor 35 is wired to a battery 38 through a switch 37, by means of wiring 36 and the switch 37 can be positioned inside the cab of the bus 27, in order to selectively and conveniently energize the motor 35. Alternatively, it will be appreciated that energizing of the motor 35 can be automatically accomplished by wiring it into the door-opening mechanism or other device in the bus 27, as desired. An extension microswitch 40, secured inside the flag storage pipe 2 rearwardly of the flared end 4 and a retraction microswitch 41, positioned in the flag storage pipe 2 near the cable end 5, serve to limit the travel of the tape 21 and the flag rod 10 by stopping the motor 35 at full retraction and extension of the flag rod 10 and flag 13, respectively.

In operation, and referring again to FIGS. 1, 2, 3A, 3B and 4, when the safety flag 1 is in the retracted position illustrated in FIGS. 2 and 3A, the flag 13 and flag rod 10 are deployed inside the flag storage pipe 2, as illustrated, since the tension cable 19 is retracted to a minimum length between the cable mount 20 and the recoil pulley 15. The flag 13 and flag rod 10 remain in this configuration while the bus 27 is in motion, since the stop arm 22 remains in folded configuration and as previously noted, the flag storage pipe 2 is secured to the stop sign 23 in the stop arm 22. When the bus 27 comes to a stop, the safety flag 1 can be activated by energizing the stop arm 22 in a variety of ways. In older models of the bus 27, the stop arm 22 is manually outwardly deployed by grasping a lever employing a ratchet or gear mechanism to cause the stop sign 23 to pivot outwardly on the arm hinge 24 and display the stop sign 23 to motorists following the bus. Later models of the bus 27 have incorporated vacuum-operated or electic stop arm 22 deployment devices which are in electrical cooperation with the door-opening mechanism, whereby the stop sign 23 automatically pivots outwardly from the position illustrated in FIGS. 2 and 3A, to the position illustrated in FIGS. 1 and 3B, when the door opens. Other variations include switches for deploying the stop arm 22, and it will be appreciated by those skilled in the art that any of these variations can be used in the invention described herein, according to the knowledge of those skilled in the art to cause the stop arm 22 to deploy into the safety configuration illustrated in FIGS. 1 and 3B.

As deployment of the stop arm 22 into the open, safety configuration is effected, and referring again to FIGS. 1, 2, 3A, 3B and 4 of the drawings, when the stop sign 23 begins to swing outwardly on the arm hinge 24 as indicated by the arrow in FIG. 3B, the distance between the guide pulley 8 and the cable mount 20 increases, thereby extending the tension cable 19 from the feed nipple 17 of the recoil pulley 15, against the bias of the internally wound spring located inside the recoil pulley 15. Referring to FIGS. 2 and 3A, this action causes the flag rod 10 to advance rearwardly further into the flag storage pipe 2, since the base end 12 of the flag rod 10 is secured to the tension cable 19 by the tape 21 at a point near the recoil pulley 15. As the stop sign 23 continues the outward swing, the distance between the guide pulley 8 and the cable mount 20 continues to increase and the flag rod 10 is caused to travel further through the flag storage pipe 2 and the flag 13 to exit the flared end 4 of the flag rod 10. In this regard, it will be appreciated that such variables as the thickness of the spacer block 25, the point at which the base end 12 of the flag rod 10 is joined to the tension cable 19 and the distance between the guide pulley 8 and the cable mount 20 at full deployment of the stop arm 22, must be chosen such that the outward swing of the flag storage pipe 2 allows the base end 12 and the tape 21 to clear the arm hinge 24 prior to excessive bending of the flag rod 10. Accordingly, in a most preferred embodiment of the invention the flag rod 10 is flexible and is shaped of a resilient material such as fiberglass or a like material, in order to better facilitate movement past the bushing 18. When the stop sign 23 and the flag storage pipe 2 reach the full extent of pivot and are fully deployed on the arm hinge 24 as illustrated in FIGS. 1 and 3B, the tension cable 19 is fully extended to maximum length from the recoil pulley 15. The flag 13 is, in turn, fully deployed from the flag storage pipe 2 and the base end 12 of the flag rod 10 and tape 21 are positioned in the flag storage pipe 2 adjacent the cable end 5. The flag 13 is maintained in this position until all passengers have entered and/or departed the bus 27 and the bus 27 is again in motion, at which time restraining pressure is released from the stop arm 22 and the recoil spring located inside the recoil pulley 15 exerts sufficient tension on the tension cable 19 to cause the stop sign 23 to again retract to the position illustrated in FIGS. 2 and 3A, adjacent the bus side panel 28. During this retraction, it will be appreciated that the flag rod 10 and the flag 13 are again deployed inside the flag storage pipe 2, as the tension cable 19 again winds on the recoil spring located in the recoil pulley 15 and the distance between the guide pulley 8 and the cable mount 20 decreases, in a reverse of the stop arm 20 extension operation. The safety flag 1 is then ready for another functional deployment at the next stop.

Referring again to FIGS. 1, 2, 3A, 3B and 4, it will be further appreciated by those skilled in the art that as heretofore described, such variables as the length of the flag rod 10 and the point of attachment of the base end 12 to the tension cable 19, the thickness of the spacer block 25, the distance between the guide pulley 8 and the cable mount 20 at full deployment of the stop arm 22, as well as the distance between the recoil pulley 15 and the cable mount 20, can be selected to achieve an outward extension of the flag rod 10 and flag 13 a desired distance away from the bus side panel 28. For example, for a flag rod 10 of selected length, a selected length and point of attachment of the base end 12 to the tension cable 19, a chosen distance between the guide pulley 8 and cable mount 20 and a selected distance between the recoil pulley 15 and the cable mount 20, the thickness of the spacer block 25 can be varied, with thicker versions facilitating more clearance between the flag rod 10 and the bushing 19, than thinner versions of the spacer block 25. This greater clearance allows more linear travel of the flag rod 10 responsive to the travel of the tension cable 19, before the flag rod 10 touches the bushing 18. Furthermore, in an optimum selection of the variables noted above, including the choice of a spacer block 25 of optimum thickness, the flag rod 10 is displaced linearly into the flag storage pipe 2 without touching the bushing 18 throughout its full travel.

Referring again to FIGS. 5–7 of the drawings, in operation of the second preferred embodiment of the invention incorporating the hood-mounted safety flag 26, the flag rod 10 and flag 13 are caused to extend from the flag storage pipe 2 upon activation of the motor 35, by manipulation of the switch 37 when the bus 27 comes to a stop. As in the case of the safety flag 1 illustrated in FIGS. 1, 2, 3A, 3B and 4, illustrating a first embodiment of the invention, activation of the motor 35 in the safety flag 26 can be made to depend upon opening of the door of the bus 27, or the motor 35 can be operated by manipulating the switch 27, as desired. Accordingly, referring to FIGS. 5 and 6, the motor 35 is initially activated with the flag rod 10 and flag 13 retracted inside the flag storage pipe 2, the drive pulley 34 is caused to rotate in the counter-clockwise direction and the flag rod 10 and flag 13 project from the flag storage pipe 2 in the direction indicated by the arrow. Extension of the flag end 11 of the flag rod 10 and flag 13 outwardly of the flag storage pipe 2 is terminated when the lower leg of the endless cable 32 contacts the extension microswitch 40 to stop the motor 35, which is wired to the extension microswitch 40. The flag 13 remains in deployed configuration as illustrated in FIG. 5, until the bus 27 again is placed in motion, whereupon the motor 35 is activated in the opposite direction, to effect a retraction of the flag rod 10 inside the flag storage pipe 2, and termination in the operation of the motor 35, by contact between the base end 12 and the retraction microswitch 41, as illustrated in FIG. 6.

Referring again to the drawings, it will be appreciated that in both embodiments of the invention the flared end 4 of the flag storage pipe 2 need not be flared, but can be the same diameter as the cable end 5, if desired. However, it has been found that the flag 13 is most preferably manufactured of a soft, light material such as silk, in order to facilitate easy, random folding of the flag 13 during entry of the flag 13 into the flag storage pipe 2. In this regard, it is preferred to provide a flared end 4 in the flag storage pipe 2, in order to reduce the friction and resistance of the flag 13 during such entry. This reduction of friction and resistance to entry of the flag 13 is important, since the spring located in the recoil pulley 15 must operate not only to pull the flag 13 into the flag storage pipe 2, but also to fold the stop arm 22 against the bus side panel 28, the latter function normally performed by a conventional hinge spring located in the arm hinge 24. Accordingly, it is sometimes necessary to remove the conventional hinge spring located in the arm hinge 24 in some models of the stop arm 22, since the spring in the recoil pulley 15 is frequently not capable of operating against the tension in this hinge spring.

While the preferred embodiments of the invention have been described above it will be recognized and understood that various modifications may be made therein and the appended claims are intended to cover all such modifications which may fall within the spirit and scope of this invention.

Having described my invention with the particularity set forth above what is claimed is:

1. A safety flag for a vehicle provided with a stop arm mechanism having a hinge and capable of opening into an open configuration and closing into a closed configuration on the hinge with respect to the vehicle, comprising:
   (a) receiving means having a first end carried by the stop arm mechanism;
   (b) an opening provided in the wall of said receiving means and guide pulley means rotatably provided on said receiving means;
   (c) a flag rod having one end inserted in the opposite end of said receiving means from said first end and a flag attached to the opposite end of said flag rod;
   (d) bushing means carried by the stop arm and a cable mount attached to the vehicle in spaced relationship with respect to said bushing means;
   (e) recoil pulley means spaced from said cable mount and said bushing means, said recoil pulley means secured to the vehicle; and
   (f) cable means retractably wound in said recoil pulley means and one end of said cable means extending from said recoil pulley means around said bushing means, into said receiving means, through said opening and around said guide pulley means, said one end provided in fixed attachment to said cable mount, and said one end of said flag rod attached to said cable means, whereby opening of the stop arm mechanism to the open configuration extends a segment of said cable means from said recoil pulley means and causes said opposite end of said flag rod and said flag to project from said opposite end of said receiving means and closing of the stop arm mechanism to the closed configuration causes said segment of said cable means to retract into said pulley means and said opposite end of said flag rod and said flag to retract into said opposite end of said receiving means.

2. The safety flag of claim 1 wherein said receiving means is a pipe and said opposite end is flared, whereby said flag is more easily received inside said pipe.

3. The safety flag of claim 1 wherein said one end of said flag rod is attached to said cable means in close proximity to said recoil pulley when said safety flag and the stop arm are in the closed configuration.

4. The safety flag of claim 1 wherein:
   (a) said receiving means is a pipe and said opposite end is flared, whereby said flag is more easily received inside said pipe; and
   (b) said one end of said flag rod is attached to said cable means in close proximity to said recoil pulley means when said safety flag and the stop arm are in the closed configuration.

5. The safety flag of claim 1 further comprising spacer means located between the stop arm and the vehicle, whereby additional clearance between said flag rod and said vehicle is facilitated.

6. The safety flag of claim 1 further comprising spacer means located between the stop arm and the vehicle, whereby additional clearance between said flag rod and said vehicle is facilitated and wherein:
   (a) said receiving means is a pipe and said opposite end is flared, whereby said flag is more easily received inside said pipe; and
   (b) said one end of said flag rod is attached to said cable means in close proximity to said recoil pulley means when said safety flag and the stop arm are in the closed configuration.

7. The safety flag of claim 1 wherein said flag rod is shaped from a substantially resilient material and said flag is silk.

8. The safety flag of claim 6 wherein said flag rod is shaped from a substantially resilient material and said flag is silk.

9. The safety flag of claim 1 wherein said bushing means is positioned in rotatable cooperation with the hinge in the stop arm mechanism.

10. The safety flag of claim 1 further comprising spacer means located between the stop arm and the vehicle, whereby additional clearance between said flag rod and said vehicle is facilitated and wherein:
    (a) said receiving means is a pipe and said opposite end is flared, whereby said flag is more easily received inside said pipe;
    (b) said one end of said flag rod is attached to said cable means in close proximity to said recoil pulley when said safety flag and the stop arm are in the closed configuration; and
    (c) said bushing means is positioned in rotatable cooperation with the hinge in the stop arm mechanism.

11. A safety flag for a vehicle provided with a conventional stop arm mechanism having a foldable warning element capable of closing to a retracted configuration and opening to a functional configuration on a hinge element, comprising:
    (a) elongated pipe means having one end secured to the foldable warning element of the stop arm, the opposite end of said pipe means flared to a diameter larger than the average diameter of said pipe means;
    (b) guide pulley means rotatably carried by said pipe means adjacent said opposite end and a slot provided in said pipe means intermediate said one end and said opposite end of said pipe means;
    (c) bushing means rotatably carried by the hinge element in the stop arm mechanism and a cable mount provided in fixed attachment to the vehicle at a point on the vehicle rearwardly spaced from said bushing means;
    (d) recoil pulley means provided in fixed attachment to the vehicle at a point on the vehicle forwardly spaced from said bushing means;
    (e) cable means retractably wound in said recoil pulley means, the free end of said cable means extending in biased relationship from said recoil pulley means around said bushing means, into said pipe means via said one end, through said slot and around said guide pulley means, said free end secured in fixed attachment to said cable mount; and
    (f) a flag rod having a first end inserted in said pipe means, said first end secured to said cable means and a flag attached to the second end of the said flag rod, whereby outward folding of the warning element on the hinge element of the flag arm to the functional configuration extends a segment of said cable means from said recoil pulley means and causes said second end of said flag rod and said flag to extend from said opposite end of said pipe means, and inward folding of the warning element on the hinge element of the flag arm to the retracted configuration allows said segment of said cable means to retract into said recoil pulley and said second end of said flag rod and said flag to retract into said opposite end of said pipe means.

12. The safety flag of claim 11 wherein said first end of said flag rod is attached to said cable means in close proximity to said recoil pulley means when said safety flag and the stop arm are in the retracted configuration.

13. The safety flag of claim 11 further comprising spacer means located between the stop arm and the vehicle, whereby additional clearance between said flag rod and said vehicle is facilitated.

14. The safety flag of claim 11 wherein said first end of said flag rod is attached to said cable means in close proximity to said recoil pulley means when said safety flag and the stop arm are in the retracted configuration and further comprising spacer means located between the stop arm and the vehicle, whereby additional clearance between said flag rod and said bushing means is facilitated.

15. The safety flag of claim 11 wherein said flag rod is shaped from a substantially resilient material and said flag is silk.

16. The safety flag of claim 14 wherein said flag rod is shaped from a substantially resilient material and said flag is silk.

17. A safety flag for a vehicle comprising:
    (a) a pipe having a side slot, a flared end and an opposite end, said pipe secured to the vehicle;
    (b) drive pulley means situated in rotatable relationship with respect to one said opposite end of said pipe;
    (c) idler pulley means situated in rotatable relationship on said flared end of said pipe;
    (d) endless cable means having relatively upper and lower disposed parallel legs, with said lower one of said legs extending through said side slot in said pipe and a portion of said lower one of said legs disposed in said pipe, said cable means linking said drive pulley means and said idler pulley means;
    (e) a flag rod disposed in said pipe, a first end of said flag rod secured to said lower one of said legs of said endless cable means and a flag secured to the second end of said flag rod; and
    (f) an electric motor in cooperation with said drive pulley means, whereby operation of said electric motor in one direction causes said second end of said flag rod and said flag to project from said flared end of said pipe and operation of said electric motor in the opposite direction causes said second end of said flag rod and said flag to retract into said flared end of said pipe.

18. The safety flag of claim 17 further comprising first stop means located in said pipe at said opposite end, said first stop means positioned in substantial alignment with said first end of said flag rod and second stop means located in said receiving means rearwardly of said flared end of said pipe, said second stop means positioned in substantial alignment with said portion of said lower one of said legs whereby retraction of said flag rod into said pipe is terminated by contact between said first stop means and said opposite end of said flag rod and extension of said flag rod from said pipe is terminated by contact between said portion of said lower one of said legs and said second stop means.

19. The safety flag of claim 18 wherein said first stop means is a first microswitch in electrical cooperation with said electric motor and said second stop means is a second microswitch in cooperation with said electric motor.

* * * * *